United States Patent [19]

Kohno et al.

[11] Patent Number: 5,029,991
[45] Date of Patent: Jul. 9, 1991

[54] LENS BARREL

[75] Inventors: Takahiro Kohno, Kanagawa; Masae Miyakawa, Saitama, both of Japan

[73] Assignee: Canon Kabushiki Kaisha, Tokyo, Japan

[21] Appl. No.: 505,830

[22] Filed: Apr. 6, 1990

[30] Foreign Application Priority Data

Apr. 13, 1989 [JP] Japan .................................. 1-094486
Apr. 13, 1989 [JP] Japan .................................. 1-094487

[51] Int. Cl.⁵ .............................................. G02B 15/00
[52] U.S. Cl. .................................... 350/429; 350/257
[58] Field of Search ............... 350/429, 430, 255, 257; 354/271.1, 270, 400, 409, 435, 446; 361/397, 398

[56] References Cited

U.S. PATENT DOCUMENTS

| | | | |
|---|---|---|---|
| 4,083,057 | 4/1978 | Quinn | 350/429 |
| 4,161,756 | 7/1979 | Thomas | 350/429 |
| 4,626,077 | 12/1986 | Yamamoto | 350/429 |
| 4,964,697 | 10/1990 | Fuziwara | 350/429 |

Primary Examiner—Bruce Y. Arnold
Assistant Examiner—Loha Ben
Attorney, Agent, or Firm—Robin, Blecker, Daley & Driscoll

[57] ABSTRACT

In a lens barrel having an electromechanical transducer for driving an iris mechanism, a zooming motor for driving a zoom mechanism and focusing motor for driving a focusing mechanism, at least one of the zooming motor and the focusing motor is arranged to be a geared motor in which a motor part and a reduction gear part are interconnected in the direction of an output shaft; and the motor part of the geared motor is disposed in front of the reduction gear part as viewed in the direction of the optical axis of the lens barrel.

39 Claims, 8 Drawing Sheets

LENS BARREL

BACKGROUND OF THE INVENTION

1. Field of the Invention

This invention relates to a lens barrel to be used for a camera or the like.

2. Description of the Related Art

FIGS. 7 and 8 of the accompanying drawings show by way of example the conventional lens barrel adapted for a video camera. These illustrations include a lens barrel body 110; an iris galvanometer (IG meter) 112 which is arranged to drive an iris; a zooming motor 114; a reducing transmission system 115 which is arranged to reduce the output of the zooming motor 114 and to rotatively drive a zoom ring 117 to perform a zooming action; and a focusing motor 116 which is arranged to perform a focusing action by rotatively driving a distance ring 119 through a reducing transmission system similar to the reducing transmission system 115 which is provided for zooming. Circuit elements which are not shown in detail are arranged on a printed circuit board 118. A distance measuring device 120 is of the active type. Although it is not shown, a printed circuit board having a large area is arranged within the lens barrel in a manner as disclosed in U.S. patent application Ser. No. 136,346 filed on Dec. 22, 1987.

Electrical elements such as a CCD, etc., that are apt to be affected by noises have recently come to be incorporated in the camera body of a video camera or the like. For the video camera of this kind, if the zooming motor 114 and the focusing motor 116 are disposed at the rear end of the optical axis (closest to the camera body) like the conventional lens barrel, the electrical elements such as a CCD, etc., would be affected by noises produced by the motors 114 and 116.

Further, if three drive sources (for aperture, zooming and focusing) are included within the lens barrel, like in the case of a video camera, the lens barrel would be greatly deformed from the cylindrical external shape of the above-stated example of the conventional lens barrel. This not only increases restrictions imposed on the design of the lens barrel but also deteriorates the mounting and dismounting operability of the lens barrel in cases where the lens is arranged to be interchangeable.

SUMMARY OF THE INVENTION

It is one aspect of this invention to provide a lens barrel, wherein geared motors are used for zooming and focusing; and the geared motor parts are arranged on the front side of the optical axis of the lens and are thus disposed away from the electrical elements such as a CCD, etc., of the camera body, so that the adverse effect of noises on these electrical elements can be lessened.

It is another aspect of the invention to provide a lens barrel, wherein three drive sources for aperture adjustment, zooming and focusing are arranged around the optical axis of the lens and are disposed at about equal diametral distances from the optical axis; and the lens barrel is formed in an approximately cylindrical shape with a cover disposed around the optical axis at about the outermost end positions of the three drive sources.

The above and other objects and features of the invention will become apparent from the following detailed description of an embodiment thereof taken in connection with the accompanying drawings.

DETAILED DESCRIPTION OF THE PREFERRED EMBODIMENT

Figure 1:
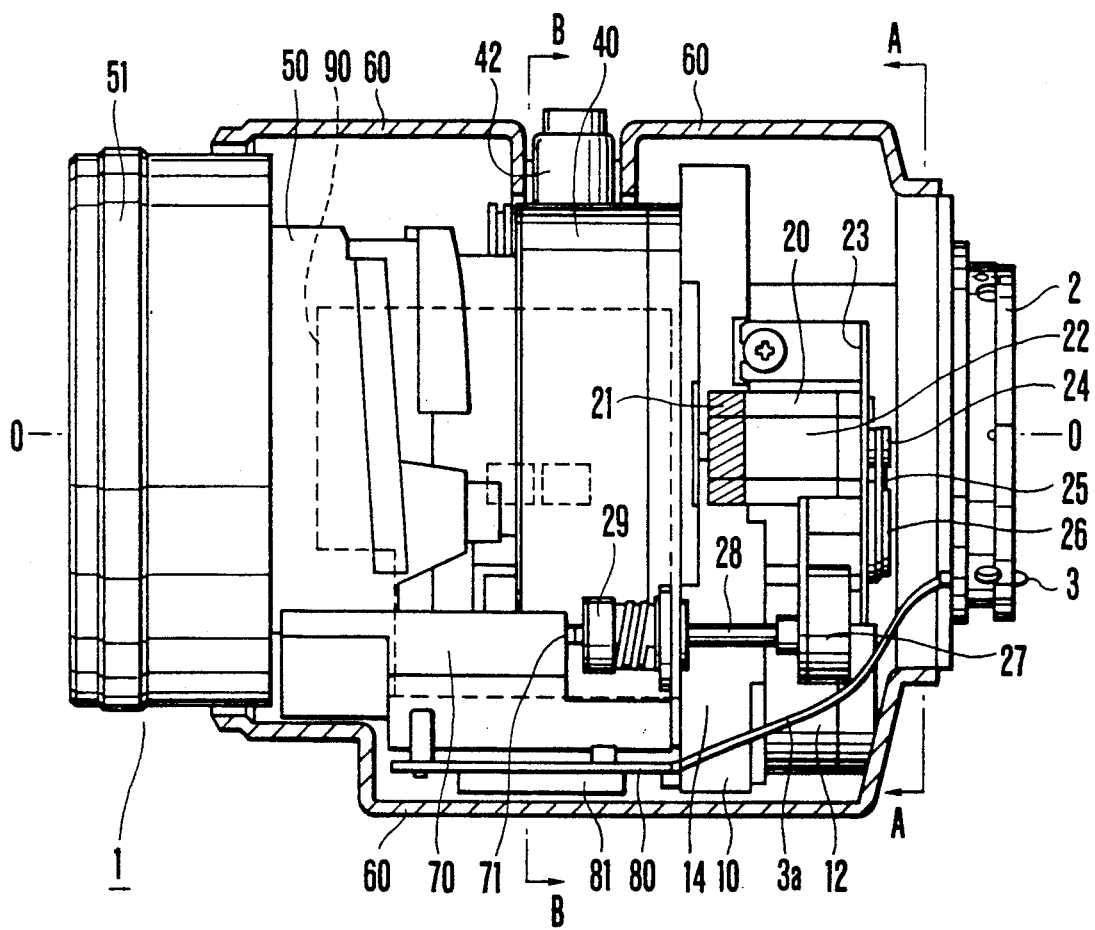
FIG. 1 is a sectional view showing the internal arrangement of an interchangeable lens barrel which is arranged according to this invention as an embodiment thereof.

FIGS. 1 to 6 show an interchangeable lens barrel for a video camera arranged according to this invention as an embodiment thereof. In these drawings, a reference numeral 1 denotes the interchangeable lens barrel and a numeral 2 a mount which is provided for mounting and dismounting the lens on and from a camera body. A mount contact 3 is arranged to be located at a lower part of the mount 2 and to permit communication with and power supply from the camera body by coming into contact with the mount contact of the camera body when the lens is mounted on the camera body. An iris unit 10 has iris blades 14 which are not shown but have their location indicated by the reference numerals 14. An iris galvanometer 12 (hereinafter abbreviated as IG meter) is arranged to drive the iris blades to adjust the aperture of the iris unit 10 so that an apposite quantity of light can be guided to an image sensor such as a CCD disposed on the side of the camera body. An ordinary stepper motor instead of the IG meter 12 may be employed as the drive source for driving the iris unit 10. As apparent from the drawings, the IG meter 12 is located on the lower side of the interchangeable lens 1 when the lens is mounted on the camera body which is not shown. A geared motor is employed as a zooming motor 20. The zooming motor 20 includes a motor part 21 which consists of a brush and a coil and is indicated with hatching in FIGS. 1 and 4; and a reduction gear part 22 which is composed of a reduction gear arrangement. A support frame 23 is arranged to carry the zooming motor 20. A driving wheel 24 of a belt transmission mechanism is secured to the output shaft of the above-stated reduction gear part 22. The rotation of the driving wheel 24 is transmitted to a trailing wheel 26 by a belt 25 and is further reduced by a reduction gear train 27 before it is transmitted to a driving shaft 28. At the tip of the driving shaft 28 is disposed a driving gear 29 which is friction-coupled with the driving shaft through a spring. The driving gear 29 engages the gear part (not shown) of a zoom ring 40. A focusing motor 30 is a geared motor. The focusing motor 30 includes a motor part 31 which consists of a brush and a coil and is indicated with hatching in FIG. 4; and a reduction gear part 32 which is composed of a reduction gear arrangement. A support frame 33 carries the focusing motor 30. A driving wheel 34 of a belt transmission mechanism is secured to the output shaft of the reduction gear part 32. The rotation of the driving wheel 34 is transmitted to a trailing wheel 36 via a belt 35 and is further reduced by a reduction gear train 37 before it is transmitted to a driving shaft 38. A driving gear 39 is friction-coupled with the tip of the driving shaft 38 by means of a spring. The driving gear 39 engages the gear part (not shown) of a distance ring 50 which will be described later.

The IG meter 12, the motor 20 and the motor 30 are positioned at approximately equal distances from an optical axis O—O.

The zoom ring 40 is rotatably carried and is arranged to be rotatable either manually by means of a knob 42 or automatically by means of the driving gear 29. With the zoom ring 40 rotated, a cam ring which is not shown rotates in association with the rotation of the zoom ring 40. The rotation of the cam ring causes a lens 43, etc., provided for zooming to shift in the direction of the optical axis. The distance ring 50 is also rotatably carried and is rotatable either manually by means of an operation part 51 or automatically by the driving gear 39. With the distance ring 50 rotated, a focusing action is performed by shifting the lens in the direction of the optical axis through a helicoid which is not shown.

A cover 60 is provided with stopper parts 61 and 62 for limiting the rotation angle of the zoom ring 40. Therefore, the zoom ring 40 is rotatable about 120 degrees until the knob 42 thereof comes to abut on the stopper parts 61 and 62.

A holder 70 is secured to the body of the interchangeable lens 1. The holder 70 has bearing parts 71 for the driving gears 29 and 39 (the bearing part for the driving gear 39 is not shown) and is arranged to support printed circuit boards 80 and 90 and an encoder substrate 100 by means of studs 72, 73, 74, 75, 76, etc.

A first printed circuit board 80 is arranged on the lower side of the interchangeable lens barrel 1 (with the lens mounted on the camera body) and in parallel with the optical axis O—O. A large chip element 81 is mounted on the lower side of the printed circuit board 80. The large chip element 81 is a CPU having a memory which stores lens data of varied kinds including the maximum aperture value of the lens. The first printed circuit board 80 is disposed in a position deviating (not overlapping) in the direction of the optical axis from the iris unit 10 which includes the above-stated IG meter 12 and is also located on the lower side. In addition to that, the position of the first printed circuit board 80 does not exceed the end of the iris unit 10 in the diametral direction.

Figure 2:
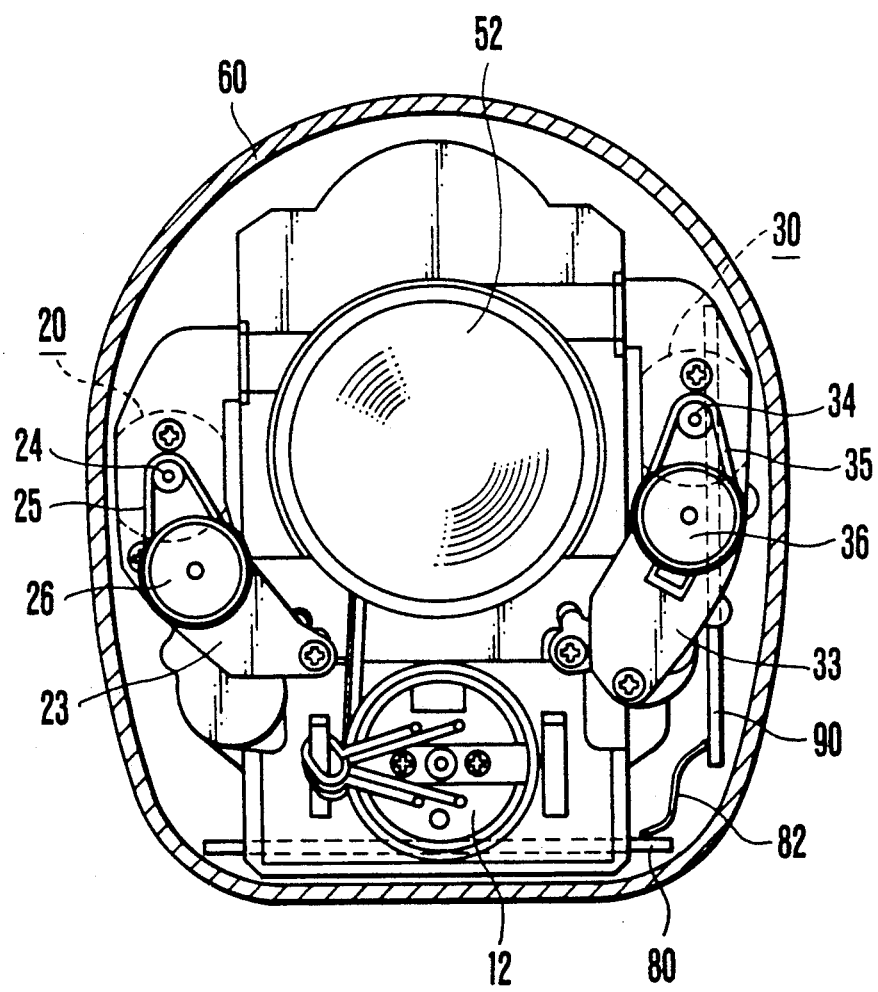
FIG. 2 is a sectional view taken on a line A—A of FIG. 1 and shows the lens as viewed from the right side thereof.
Figure 3:
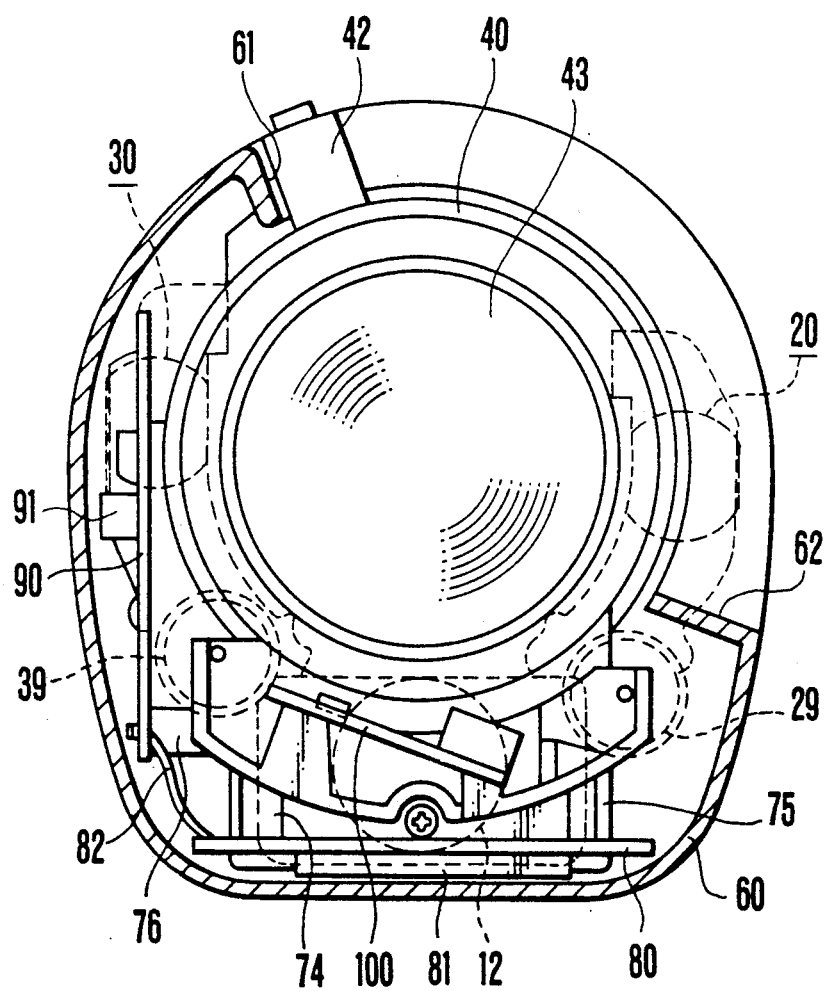
FIG. 3 is a sectional view taken on a line B—B of FIG. 1 and shows the lens as viewed from the left side thereof.
Figure 4:
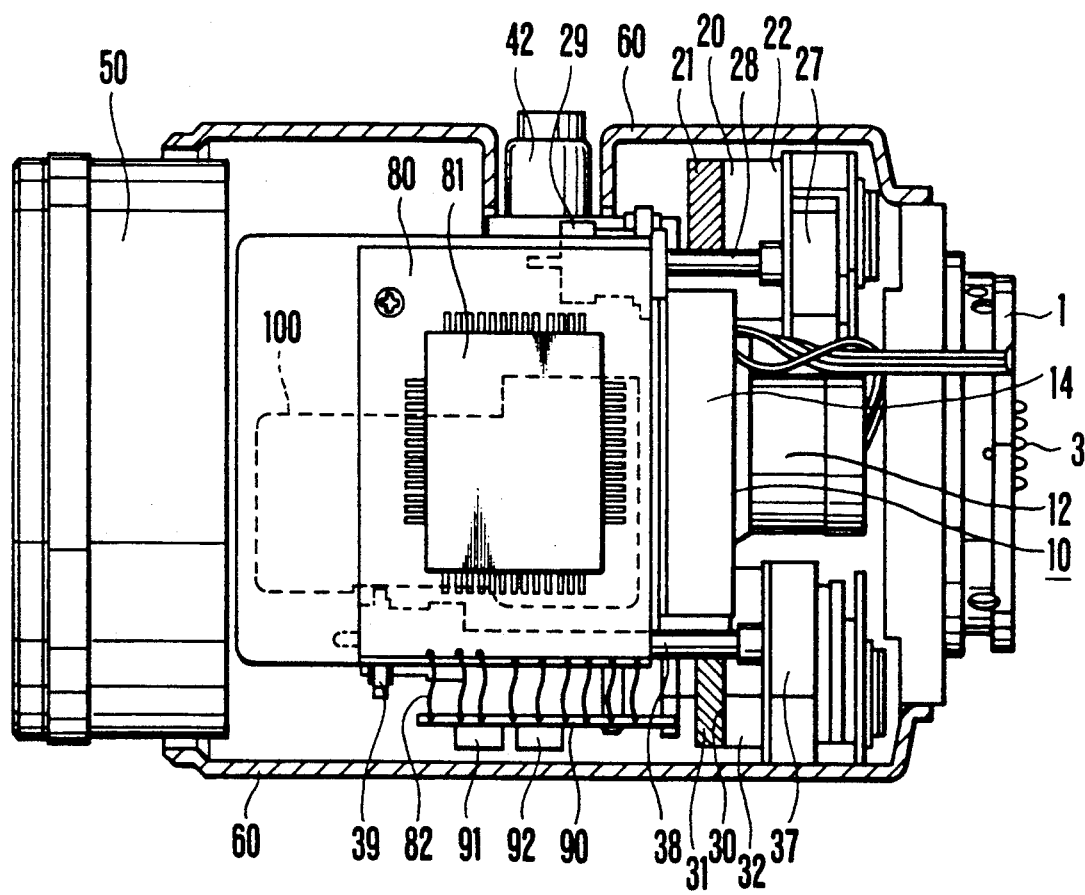
FIG. 4 shows the lens of FIG. 1 as viewed from the bottom thereof.
Figure 5:
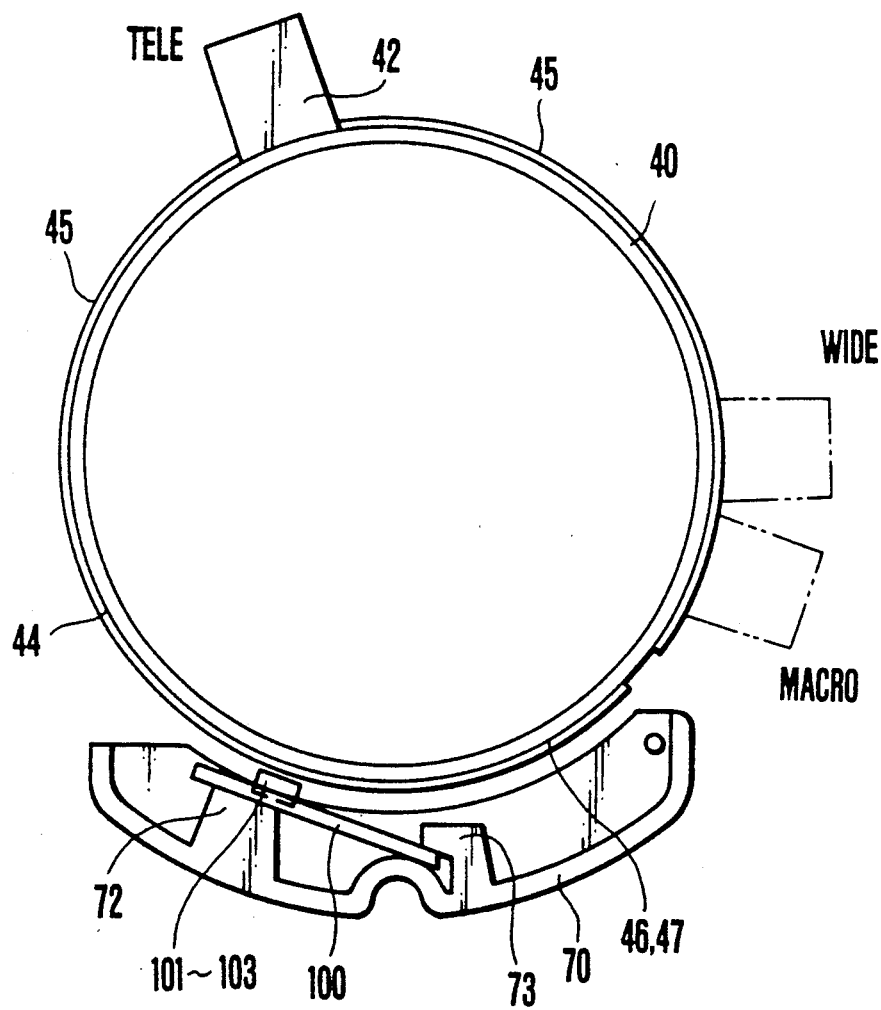
FIG. 5 shows a zoom ring in relation to an encoder substrate.

A second printed circuit board 90 is disposed in parallel to the optical axis O—O in a position which is on one side of the interchangeable lens barrel 1 and deviates about 90 degrees from the first printed circuit board 80 as viewed on FIGS. 2 and 3. Circuit elements 91, 92, etc., which are a resistor, a capacitor, a small chip element, etc. are mounted on the outside of the second printed circuit board 90. Further, the position of the second printed circuit board 90 deviates (not overlapping) from the above-stated zooming motor 20 in the direction of the optical axis and does not exceed the end position of the zooming motor 20 in the diametral direction. The first and second printed circuit boards 80 and 90 are electrically interconnected by a lead wire 82.

The encoder substrate 100 is disposed on the lower side of the interchangeable lens barrel 1 in a position overlapping the first printed circuit board 80 on the inner diametrical side. On the encoder substrate 100 are mounted light reflection sensors 101 to 103 for zooming and light reflection sensors 104 and 105 for focusing. These sensors are capable of detecting the rotation angle of the zoom ring 40 and that of the distance ring 50.

Figure 6:
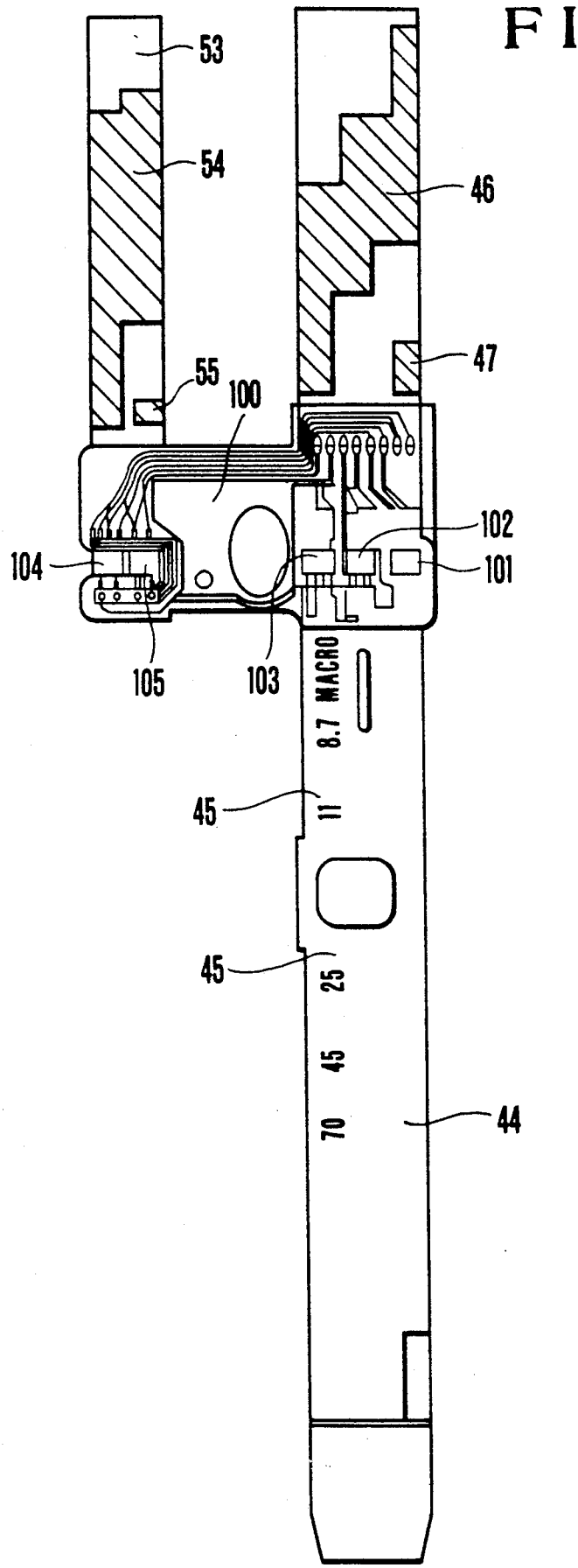
FIG. 6 is a development view showing the pattern detecting action of the encoder substrate.
Figure 7:
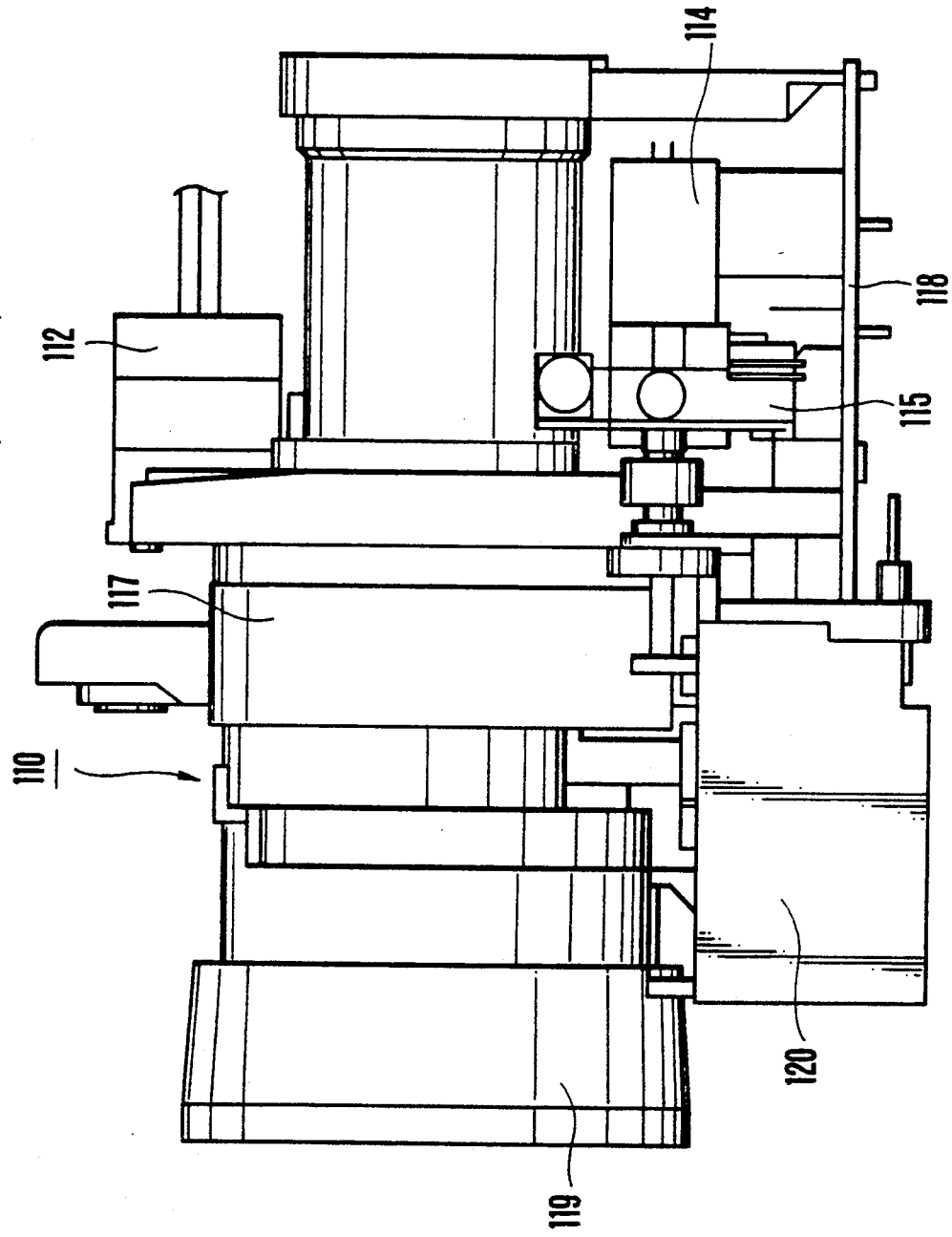
FIG. 7 shows the conventional lens barrel with its cover removed.
Figure 8:
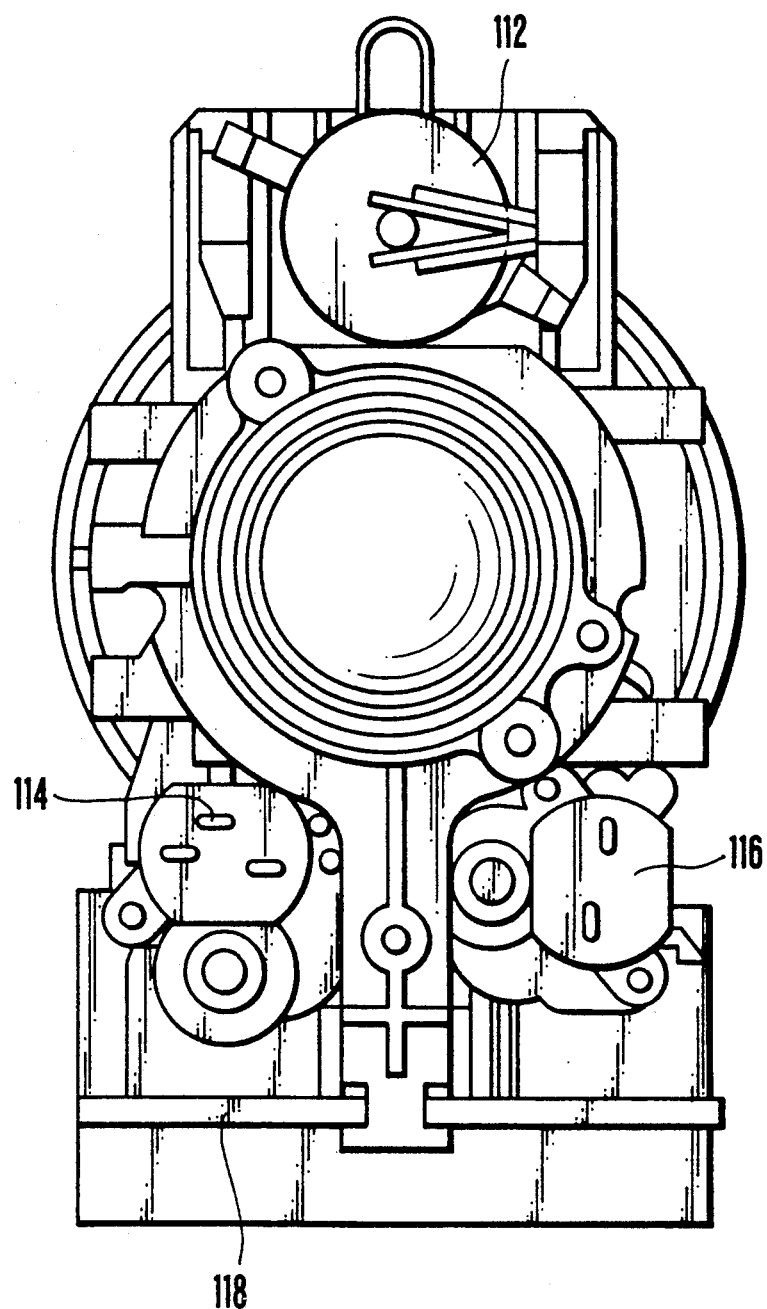
FIG. 8 shows the lens barrel of FIG. 7 as viewed from its right side.

Referring to FIG. 6, the encoder substrate 100 is arranged to detect the above-stated rotation angles in the following manner: A pattern plate 44 which is in a stripe-like shape is adhered to the zoom ring 40. In FIG. 6, the pattern plate 44 is shown in a stretched state for the sake of illustration. The position in the optical axis direction of the pattern plate 44 is nearly in phase with the knob 42. Indexes 45 which indicate focal lengths and patterns 46 and 47 (hatched areas) which are provided by patternizing preset ranges of focal lengths are printed on the pattern plate 44. The patterns 46 and 47 are printed in colors (or reflection factors) which differ from other areas. A total of seven different focal length sections are detectable by means of the three light reflection sensors 101, 102 and 103. Another pattern plate 53 which is also in a stripe-like shape is adhered to the distance ring 50. The pattern plate 53 is also shown in a stretched state in FIG. 6 for the sake of illustration. Printed on this pattern plate 53 are patterns 54 and 55 (hatched areas) which indicate preset distances in a patternized state. These patterns 54 and 55 are printed in colors (or reflection factors) which differ from the color of other areas. Positions on the distance ring 50 of four different distance sections, including a macro area, an ordinary area, an area immediately before the nearest distance and an area immediately before the infinity distance, are detectable by means of the two light reflection sensors 104 and 105. Further, the encoder substrate 100 is electrically connected to the first printed circuit board 80. The first printed circuit board 80 is electrically connected to the mount contact 3 via a lead wire 3a.

An electrical element such as a CCD that is vulnerable to a motor noise has recently come to be popularly incorporated in a camera body. This calls for a solution of the problem. In the case of this embodiment, the solution is as follows: Geared motors are employed as the motors 20 and 30 for zooming and focusing. The motor parts 21 and 31 are disposed on the front side of the optical axis (away from the camera body). This arrangement effectively mitigates the adverse effect of the motor noise on the camera body.

Further, the three drive sources 12, 20 and 30 for the iris, zooming and focusing are disposed around the optical axis and at about equal distances from the optical axis in the diametral direction of the lens. This arrangement enables the cover 60 to be formed in a shape which is more cylindrical in shape than the cover of the conventional lens. In the case of this embodiment, a part of the cover 60 on the lower side thereof is flattened, because: The IG meter 12 has a larger diameter than other motors 20 and 30 and the first printed circuit board 80 is arranged to have a larger mounting area.

It is important that the interchangeable lens barrel is formed approximately in a cylindrical shape as a whole. It is important particularly for ensuring that the lens is easily attachable to and detachable from the camera body. In the case of this embodiment, the three drive sources 12, 20 and 30 and the printed circuit boards 80 and 90 are arranged to overlap in the diametral direction of the lens. That arrangement prevents the drive sources from protruding outward as in the case of the conventional interchangeable lens barrel.

Electrical control elements of varied kinds including among others electrical elements having large chip areas, such as a CPU, etc. have recently come to be necessarily arranged within the lens. As a result, the use of a single printed circuit board hardly provides a sufficiently large space for mounting them. The use of at least two or more printed circuit boards has become necessary. In the case of this embodiment, the two printed circuit boards 80 and 90 are arranged around the optical axis at a spacing angle of about 90 degrees. This arrangement gives a large mounting area while the interchangeable lens barrel is formed approximately in a cylindrical shape as a whole.

Further, the drive sources 12 and 30 are arranged around the optical axis at a spacing angle of about 90 degrees. The two printed circuit boards 80 and 90 are also disposed around the optical axis at a spacing angle of about 90 degrees with their phases adjusted to those of the drive sources 12 and 30. By virtue of that arrangement, a large mounting area is secured using only the two printed circuit boards 80 and 90 without impairing the approximately cylindrical shape of the interchangeable lens barrel.

In the case of the embodiment described, the three drive sources 12, 20 and 30 and the printed circuit boards 80 and 90 are arranged to have their positions deviated from each other without overlapping in the diametral direction of the lens. However, to prevent the whole length of the interchangeable lens barrel from becoming too long, the three drive sources 12, 20 and 30 are arranged to be in phase in the direction of the optical axis while they are disposed around the optical axis.

Further, the printed circuit board 80 is disposed to be in phase with the position of the mount contact 3 around the optical axis. This facilitates the electrical connection of them.

In the case of the embodiment described, this invention is applied to an interchangeable lens barrel. However, the invention is of course advantageously applicable also to a lens barrel which is undetachably secured to the camera body. Further, the two printed circuit boards 80 and 90 are made of a hard board material. However, use may be made of a single flexible printed circuit board with its flat areas set to serve as the areas of the printed circuit boards 80 and 90. Such modification is possible so long as the flat areas are arranged in the same manner as in the case of this embodiment.

What is claimed is:

1. A lens barrel comprising:
   a) an electromechanical transducer which serves as a drive source for an iris mechanism;
   b) a zooming motor which serves as a drive source for a zoom mechanism; and
   c) a focusing motor which serves as a drive source for a focusing mechanism,
   wherein at least one of said zooming motor and said focusing motor is a geared motor including a motor part and a reduction gear part which are connected to each other in the direction of an output shaft thereof, said geared motor being arranged to have said motor part disposed in front of said reduction gear part in the direction of an optical axis of the lens barrel.

2. A lens barrel according to claim 1, wherein said geared motor is positioned within and near the rear end of said lens barrel in the optical axis direction.

3. A lens barrel according to claim 1, wherein said two motors are disposed in about equal positions in the optical axis direction within said lens barrel.

4. A lens barrel according to claim 3, wherein outputs of said two motors are transmitted to said zoom mechanism and said focusing mechanism through two shafts which extend in the direction of the optical axis.

5. A lens barrel according to claim 3, wherein said two motors are disposed around the optical axis at a phase difference of about 180 degrees.

6. A lens barrel according to claim 3, wherein said two motors are disposed in positions which are approximately equal to the position of said iris mechanism in the optical axis direction.

7. A lens barrel according to claim 3, wherein a large chip element is positioned away from said two motors in the optical axis direction and is mounted on a printed circuit board.

8. A lens barrel according to claim 3, wherein said lens barrel is an interchangeable lens barrel.

9. A lens barrel according to claim 8, wherein said lens barrel has an approximately cylindrical appearance.

10. A lens barrel comprising:
    a) an electromechanical transducer which serves as a drive source for an iris mechanism;
    b) a zooming motor which serves as a drive source for a zoom mechanism; and
    c) a focusing motor which serves as a drive source for a focusing mechanism,
    wherein said three drive sources are disposed along around an optical axis of the lens barrel in positions which are approximately at equal diametral distances from the optical axis.

11. A lens barrel according to claim 10, wherein outputs of said two motors are transmitted to said zoom mechanism and said focusing mechanism through two shafts which extend in the direction of the optical axis.

12. A lens barrel according to claim 10, wherein said two motors are disposed around the optical axis at a phase difference of about 180 degrees.

13. A lens barrel according to claim 10, wherein a large chip element is positioned away from said three drive sources in the direction of the optical axis and is mounted on a printed circuit board.

14. A lens barrel according to claim 10, wherein said lens barrel is an interchangeable lens barrel.

15. A lens barrel according to claim 14, wherein said lens barrel has an approximately cylindrical appearance.

16. A lens barrel according to claim 14, wherein said three drive sources are disposed near a mount which is provided for coupling the lens barrel with the body of an optical apparatus.

17. A lens barrel according to claim 10, wherein a cover is formed in a shape which has the maximum outside diameter thereof defined approximately by the end parts of said three drive sources in the diametral direction of the lens barrel.

18. A lens barrel comprising:
    a) an electromechanical transducer which serves as a drive source for an iris mechanism;
    b) a zooming motor which serves as a drive source for a zoom mechanism;
    c) a focusing motor which serves as a drive source for a focusing mechanism; and
    d) a printed circuit board having electrical elements mounted on a flat area thereof which is formed approximately in parallel to an optical axis of the lens barrel, said printed circuit board being positioned away from said three drive sources in the direction of the optical axis.

19. A lens barrel according to claim 18, wherein a plurality of flat areas are formed on said printed circuit board, and wherein said plurality of flat areas are disposed around the optical axis in positions differing about 90 degrees from each other.

20. A lens barrel according to claim 18, wherein said electromechanical transducer and one of said two motors are disposed around the optical axis in positions differing about 90 degrees from each other; said printed circuit board has a plurality of flat areas formed thereon; and said flat areas are disposed around the optical axis in positions substantially differing about 90 degrees from each other with their phases adjusted to the phase of said electromechanical transducer and that of said one of said two motors.

21. A lens barrel according to claim 18, wherein said three drive sources are disposed in positions which are approximately equal to each other in the direction of the optical axis.

22. A lens barrel according to claim 18, further comprising detecting means for detecting a zooming state of said zoom mechanism.

23. A lens barrel according to claim 22, wherein said detection means includes a sensor arranged to detect a movement, said sensor being mounted on a printed circuit board which is positioned away from the positions of said three drive sources in the direction of the optical axis of the lens barrel.

24. A lens barrel according to claim 23, wherein said sensor is arranged to detect a zooming state by reading a movement of a pattern formed on a extension part of a focal length indicating member, said indicating member is arranged to move in response to a zooming action.

25. A lens barrel according to claim 18, further comprising detection means for detecting a forming state of said focusing mechanism.

26. A lens barrel according to claim 25, wherein said detection means includes a sensor arranged to detect a movement, said sensor being mounted on a printed circuit board which is positioned away from the positions of said three drive sources in the direction of the optical axis of the lens barrel.

27. A lens barrel according to claim 18, further comprising detection means for detecting a zooming state of said zoom mechanism and a focusing state of said focusing mechanism.

28. A lens barrel according to claim 27, wherein said detection means includes a sensor arranged to detect a movement, said sensor being mounted on a printed circuit board which is positioned away from the positions of said three drive sources in the direction of the optical axis of the lens barrel.

29. An interchangeable lens barrel comprising:
a) an electromechanical transducer which serves as a drive source for an iris mechanism;
b) a zooming motor which serves as a drive source for a zoom mechanism;
c) a focusing motor which serves as a drive source for a focusing mechanism;
d) a mount for mounting and dismounting the lens barrel on and from the body of an optical apparatus;
e) a plurality of contacts which are disposed in the neighborhood of said mount; and
f) a printed circuit board having a flat area which is formed in a position away from said three drive sources in an optical axis of the lens barrel, said printed circuit board having electrical elements mounted on the flat area thereof, and said plurality of contacts being electrically connected to said printed circuit board.

30. A lens barrel according to claim 29, wherein a plurality of flat areas are formed on said printed circuit board, and wherein said plurality of flat areas are disposed around the optical axis in positions differing about 90 degrees from each other.

31. A lens barrel according to claim 29, wherein said electromechanical transducer and one of said two motors are disposed around the optical axis in positions differing about 90 degrees from each other; said printed circuit board has a plurality of flat areas formed thereon; and said flat areas are disposed around the optical axis in positions substantially differing about 90 degrees from each other with their phases adjusted to the phase of said electromechanical transducer and that of said one of said two motors.

32. A lens barrel according to claim 29, wherein said three drive sources are disposed in positions which are approximate equal to each other in the direction of the optical axis.

33. A lens barrel according to claim 29, further comprising detection means for detecting a zooming state of said zoom mechanism.

34. A lens barrel according to claim 33, wherein said detection means includes a sensor arranged to detect a movement, said sensor being mounted on a printed circuit board which is positioned away from the positions of said three drive sources in the direction of the optical axis of the lens barrel.

35. A lens barrel according to claim 34, wherein said sensor is arranged to detect a zooming state by reading a movement of a pattern formed on an extension part of a focal length indicating member, said indicating member is arranged to move in response to a zooming action.

36. A lens barrel according to claim 29, further comprising detection means for detecting a focusing state of said focusing mechanism.

37. A lens barrel according to claim 36, wherein said detection means includes a sensor arranged to detect a movement, said sensor being mounted on a printed circuit board which is positioned away from the positions of said three drive sources in the direction of the optical axis of the lens barrel.

38. A lens barrel according to claim 29, further comprising detection means for detecting a zooming state of said zoom mechanism and a focusing state of said focusing mechanism.

39. A lens barrel according to claim 38, wherein said detection means includes a sensor arranged to detect a movement, said sensor being mounted on a printed circuit board which is positioned away from the positions of said three drive sources in the direction of the optical axis of the lens barrel.

* * * * *

UNITED STATES PATENT AND TRADEMARK OFFICE
CERTIFICATE OF CORRECTION

PATENT NO. : 5,029,991

DATED : July 9, 1991

INVENTOR(S) : Takahiro Kohno and Masae Miyakawa

It is certified that error appears in the above-identified patent and that said Letters Patent is hereby corrected as shown below:

Col. 5, line 24.   Change "deviated" to -- deviate --

Col. 7, line 19,   Change "detecting" (first occurrence) to -- detection --

Col. 7, line 29.   Change "a" second occurrence to -- an --

Col. 7, line 33.   Change "forming" to -- focusing --

Col. 8, line 27.   Change "approximate" to -- approximately --

Signed and Sealed this

Second Day of February, 1993

*Attest:*

STEPHEN G. KUNIN

*Attesting Officer*        *Acting Commissioner of Patents and Trademarks*